US 6,728,372 B2

(12) United States Patent
Soree et al.

(10) Patent No.: US 6,728,372 B2
(45) Date of Patent: *Apr. 27, 2004

(54) WIRE BOUND TELECOMMUNICATIONS DEVICE AND A POWER SUPPLY CIRCUIT

(75) Inventors: Johannes J. Soree, Eindhoven (NL); Laurens C. Van Leeuwen, Eindhoven (NL)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1 day.

(21) Appl. No.: 09/067,906

(22) Filed: Apr. 28, 1998

(65) Prior Publication Data

US 2001/0050986 A1 Dec. 13, 2001

(30) Foreign Application Priority Data

Apr. 29, 1997 (EP) .............................. 97201253

(51) Int. Cl.[7] .............................. H04M 1/00; H04M 9/00
(52) U.S. Cl. ................................ 379/413; 379/93.36
(58) Field of Search ..................... 379/342, 377–378, 379/386–389, 399–402, 420, 441–442, 412–413, 93.36; 330/86, 282

(56) References Cited

U.S. PATENT DOCUMENTS

| | | | |
|---|---|---|---|
| 3,824,345 A | * 7/1974 | Cowpland ................... 379/386 |
| 4,453,037 A | * 6/1984 | Terry ......................... 379/400 |
| 4,465,967 A | * 8/1984 | Tokunaga et al. ........... 323/285 |
| 4,525,602 A | * 6/1985 | Robra et al. ................. 379/412 |
| 4,727,574 A | * 2/1988 | Jakab ......................... 379/413 |
| 4,866,768 A | * 9/1989 | Sinberg ...................... 379/413 |
| 4,961,220 A | * 10/1990 | Tentler et al. ............... 379/413 |
| 4,975,949 A | * 12/1990 | Wimsatt et al. ............. 379/387 |
| 5,050,210 A | * 9/1991 | Dillon et al. ................ 379/413 |
| 5,138,658 A | * 8/1992 | Carter et al. ................ 379/413 |
| 5,557,670 A | * 9/1996 | Perry et al. ................. 379/399 |
| 5,581,213 A | * 12/1996 | Linder et al. ............... 330/282 |
| 5,740,241 A | * 4/1998 | Koenig et al. .............. 379/399 |

OTHER PUBLICATIONS

Philips Application Note "Application of the Tea1093 Handsfree Circuti", ETT/AN93015 of Nov. 29, 1993, pp. 1–67.
Philips Datasheet Tea1093, "Hands–Free IC", Feb. 9, 1996, pp. 1–10.
Philips Datasheet Tea1112, "Low Voltage Versatile Telephone Transmission Circuits with Dialler Interface", Feb. 16, 1996, pp. 2–8, and 15.

* cited by examiner

Primary Examiner—George Eng
(74) Attorney, Agent, or Firm—Peter Zawilski

(57) ABSTRACT

Known is a wire bound telecommunications device to be coupled to telecommunication lines comprising a transmission circuit coupled between the telecommunications lines, which transmission circuit comprises a power supply circuit for forming a supply voltage from a telecommunications line voltage, whereby the power supply circuit comprises sensing means for sensing a telecommunications line current and adjustment means for adjusting the supply voltage, a supply voltage terminal being coupled to the sensing means. In the known device, no optimal matching is obtained for the load line of the power supply to a DC-mask for line voltages as a function of a line current as prescribed for a given country. A more optimal matching is proposed. Hereto, the power supply circuit comprises a controllable current source coupled to an adjustment terminal of the adjustment means and that a control input of the controllable current source is coupled to the sensing means, whereby the power supply is arranged such that the adjustment means operates as current sinking or current sourcing means, respectively, so as to cause the supply voltage to increase or decrease, respectively, in accordance with a predetermined function.

12 Claims, 3 Drawing Sheets

WIRE BOUND TELECOMMUNICATIONS DEVICE AND A POWER SUPPLY CIRCUIT

BACKGROUND OF THE INVENTION

1. Field of the Invention

The present invention relates to a wire bound telecommunications device to be coupled to telecommunication lines comprising a transmission circuit coupled between the telecommunications lines, which transmission circuit comprises a power supply circuit for forming a supply voltage from a telecommunications line voltage, whereby the power supply circuit comprises sensing means for sensing a telecommunications line current and adjustment means for adjusting the supply voltage, a supply voltage terminal being coupled to the sensing means. Such a wire bound telecommunications device can be a wire bound telephone device, a base station of a cordless telephone apparatus, a facsimile apparatus, a personal computer having a telephone card, or the like.

The present invention further relates to a power supply circuit for use in such a telecommunications device.

2. Description of Related Art

A wire bound telecommunications device of this kind is known from the Philips Application Note "Application of the TEA1093 handsfree circuit", ETT/AN93015 of 29.11.1993, pp. 1–67. On page 39 of this application note, in FIG. 20, a block diagram is given showing a part of a wire bound telephone device, a diode bridge coupled to telephone lines a/b–b/a, and a transmission circuit TEA111x coupled between the telephones lines. The transmission circuit TEA111x, described in more detail in the Philips Datasheet TEA1112, "Low voltage versatile telephone transmission circuits with dialler interface", 16.2.1996, pp. 2–8, and 15, at least partly comprises a power supply circuit for forming a supply voltage from a voltage across the telephone lines. Other components of the power supply circuit are external to the transmission circuit and/or are comprised in a handsfree circuit TEA1093 which is coupled to the transmission circuit and to the telephone lines. The circuit TEA1093 is described in more detail in the Philips Datasheet TEA1093, "Handsfree IC", 9.2.1996, pp. 1–10. The circuitry in the ICs TEA1112 and TEA1093 and the external circuitry can also be embodied and divided over a configuration of ICs and external circuitry in principle having the same overall functionality. The power supply circuit comprises sensing means for sensing a telephone line current in the form of a so-called slope resistor SLPE of e.g. 20 Ohms and internal circuitry in the transmission IC TEA1112. At an output terminal of the power supply circuit a voltage VBB is present for supplying a load, such as a loudspeaker, via a loudspeaker amplifier fed by the voltage VBB. The available line current is determined by the telecommunications network to which the wire bound telecommunications device is to be coupled and the length of the telecommunications line. On the one hand, with fluctuating line currents, the line voltage should not increase above a given DC current mask of a given country and should not increase above a given threshold value determined by a given IC process, but on the other hand maximum power should be available as a function of the line current so that maximum power is available for the loudspeaking function, i.e., maximum loudspeaker should be obtained at a given line current. For adjusting a voltage across the transmission IC such that a maximum line voltage is achieved, adjusting means are provided in the form of an external resistor coupled to an adjustment terminal and internal circuitry in the IC TEA1112. The internal circuitry in the TEA1112 comprises a series arrangement of diodes coupled between the sensing terminal and the adjustment terminal, and an operational amplifier controlling a bipolar transistor. Internally in the IC TEA1112, the adjustment terminal is coupled to an input of the operational amplifier of which an output is controlling the bipolar transistor of which an output terminal forms a supply voltage terminal. If the external resistor is coupled to the supply voltage terminal, the voltage across the transmission circuit decreases with a decreasing value of the external resistor, whereas, if the external resistor is coupled to the sensing terminal, the voltage across the transmission circuit increases with a decreasing value of the external resistor. The internal circuitry of the TEA1112 as described can be found in the block diagram in FIG. 1 on page 3 of said Datasheet of the TEA 1112. Adjustment using the external resistor is not optimal to achieve closest following of the DC-mask so as to obtain a maximum output power as a function of the line current. It is thus a disadvantage of the known circuit that no maximum output power as a function of the line current is obtained for powering a load such as a loudspeaker amplifier coupled to a loudspeaker with this maximum power.

A general solution to the problem how to achieve optimal matching of the power supply load line to the DC-mask is described in the yet unpublished European patent application No. 96202692.8, filed by the same applicant on Sep. 26, 1996. The general solution proposes a multiple slope power management method.

SUMMARY OF THE INVENTION

It is an object of the present invention to provide a wire bound telecommunications device of the above kind wherein the DC mask is followed in a more optimal way so as to get more output power for supplying a load.

To this end the wire bound telecommunications device according to the present invention is characterized in that the power supply circuit comprises a controllable current source coupled to an adjustment terminal of the adjustment means and that a control input of the controllable current source is coupled to the sensing means, whereby the power supply is arranged such that the adjustment means operates as current sinking or current sourcing means, respectively, so as to cause the supply voltage to increase or decrease, respectively, in accordance with a predetermined function. Herewith, within an operational area of line currents, the voltage between the supply voltage terminal and a sensing terminal, i.e., the voltage across the transmission circuit is in accordance with the predetermined function of the line current.

When the control element comprises a bipolar transistor having a resistor in its emitter base path it is achieved that the predetermined function is a linear function and when the control element comprises a diode in the emitter base path it is achieved that the predetermined function is a logarithmic function, so that advantageously different DC-masks of different countries can be tracked. In other, embodiments, other predetermined functions can easily be obtained by modifying the control element accordingly. A non-linear element can be chosen for the control element having a predetermined transfer characteristic. When the controllable current source is a bipolar transistor and a control resistor is coupled between the control input and a first main electrode of the bipolar transistor, and wherein the bipolar transistor starts conducting if a voltage across the control resistor representative of the control voltage exceeds a given threshold value, it is achieved that a start current is defined so that the circuit can easily be adapted to the demands of various countries. When a current limiting resistor is coupled between an output of the controllable current source and the adjustment terminal; and after "protection" insert is achieved; maximum voltage protection. When a constant voltage resistor is coupled between the adjustment terminal and an output terminal of the sensing means, it is achieved that the voltage between the adjustment terminal and the sensing terminal is constant. This is achieved by said resistor and the described internal circuitry in the TEA1112. When the supply voltage is fed to a voltage stabilizing circuit of which an output forms the supply for a load, an output voltage is achieved in a way similar to the way disclosed on page 39 of said application note ETT/AN93015. When the voltage across the control element is fed to a further controllable current source for controlling current sinking or sourcing of a reference terminal of the voltage stabilizing circuit, the voltage across the control element is advantageously used to control a further controllable current source, e.g., in the handsfree IC TEA1093. Herewith tracking of the unstabilised supply output voltage and the stabilized supply output voltage is made the same while using simple electronic means. Namely, most of the circuitry is used in common.

BRIEF DESCRIPTION OF THE DRAWING

The present invention will now be described, by way of example, with reference to the accompanying drawings, wherein.

Throughout the figures the same reference numerals are used for the same features.

DESCRIPTION OF THE PREFERRED EMBODIMENTS

Figure 1:
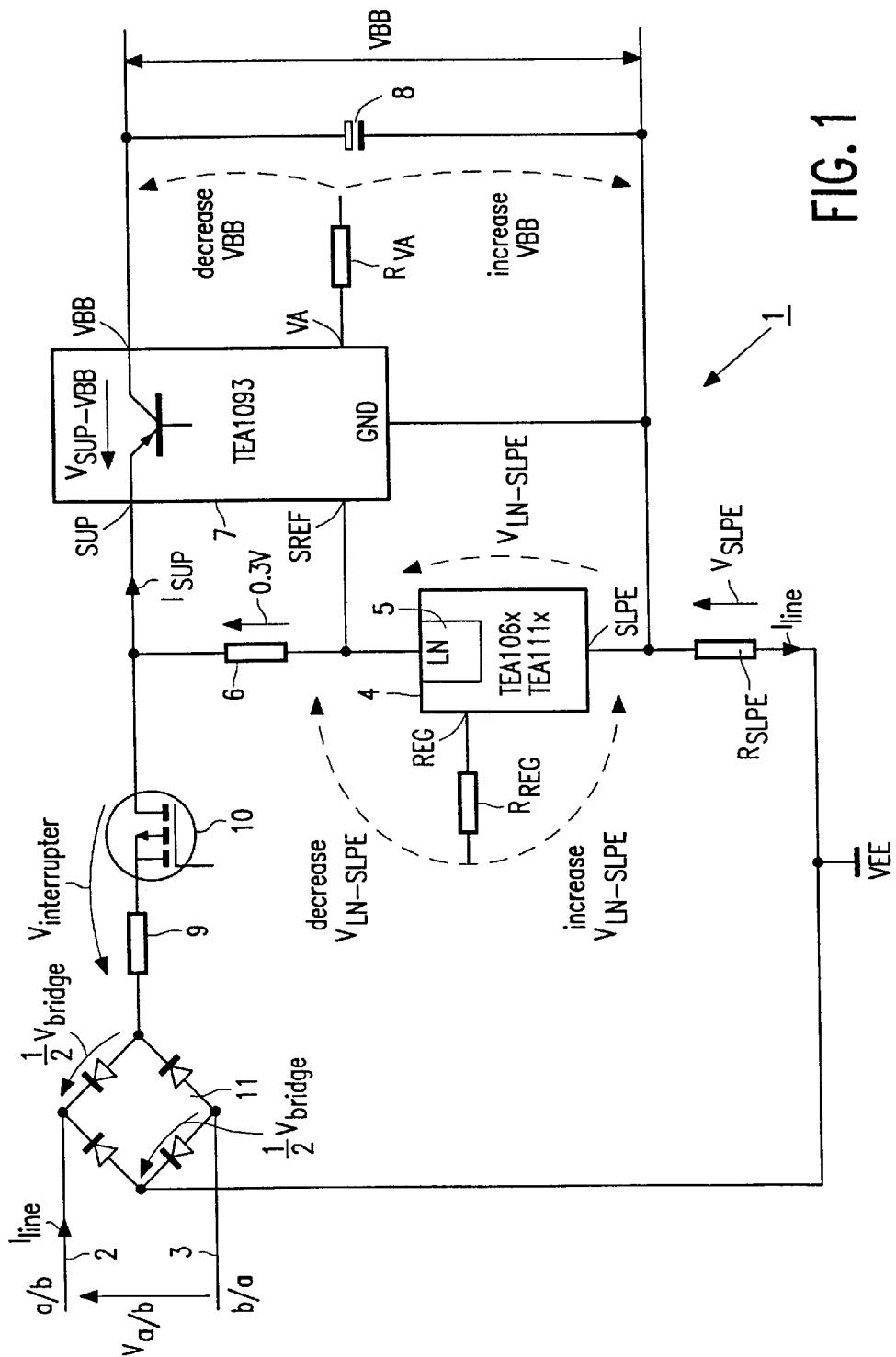
FIG. 1 schematically shows a block diagram of a wire bound telecommunications device according to the present invention.

FIG. 1 schematically shows a block diagram of a wire bound telecommunications device 1 according to the present invention, such as a wire bound telephone device. The wire bound telecommunications device 1 is coupled to telecommunication lines 2 and 3 and comprises a transmission circuit 4 coupled between the telecommunication lines 2 and 3. The transmission circuit 4, which can be an IC type TEA1112 or TEA1062 readily available the market, comprises a power supply circuit 5 for forming a supply voltage on terminal SUP from a telecommunications line voltage $V_{a/b}$. The power supply circuit comprises sensing means formed by a so called slope resistor $R_{SLPE}$ and internal circuitry in the transmission circuit 4. As described in the following, the power supply circuit 5 further comprises external circuitry and circuitry internal to an handsfree IC 7 of type TEA1093 readily available on the market. The circuitry according to the present invention is not necessarily divided over said ICs and said external circuitry in the way as described but another functionally equal distribution may occur. In principle, all of the circuitry may be in the form of discrete components but such an embodiment would not be economically feasible. The power supply circuit further comprises adjustment means including a constant voltage resistor $R_{REG}$ for adjusting the supply voltage on terminal SUP and a supply voltage terminal LN internally coupled to the sensing means. By coupling the resistor $R_{REG}$ to a sensing terminal SLPE, a voltage $V_{LN\text{-}SLPE}$ is increased and by coupling the resistor $R_{REG}$ to the terminal LN, the voltage $V_{LN\text{-}SLPE}$ is decreased. According to the present invention, the power supply circuit is arranged such that the adjustment means operates as current sinking or current sourcing means, respectively, for increasing or decreasing the voltage $V_{LN\text{-}SLPE}$ and herewith an output voltage VBB of the Integrated Circuit 7, respectively. Further shown in FIG. 1 are a line current $I_{line}$, line terminals a/b and b/a, an output buffer capacitor 8, a resistor 9 in series with an interrupter MOSFET 10, a rectifier bridge 11, a half bridge voltage ½ $V_{bridge}$, an interrupter voltage $V_{interrupter}$, a supply current $I_{SUP}$, a sensing voltage $V_{SLPE}$, an adjustment resistor $R_{VA}$ for adjusting the handsfree IC in accordance with the adjustment of the IC 4, a ground terminal GND, a reference terminal REG, a line voltage VEE, an adjustment terminal VA, and a reference terminal SREF. The power supply circuit can further comprise a voltage stabilizing circuit. Shown is a transistor 12 included in the voltage stabilizing circuit and a voltage $V_{SUP\text{-}VBB}$. Such a stabilizing is conventional in the art. The output voltage VBB can drive a load. In the given embodiment, the load can be a loudspeaker)not shown) driven by a loudspeaker amplifier (not shown) supplied by the voltage VBB.

Figure 2:
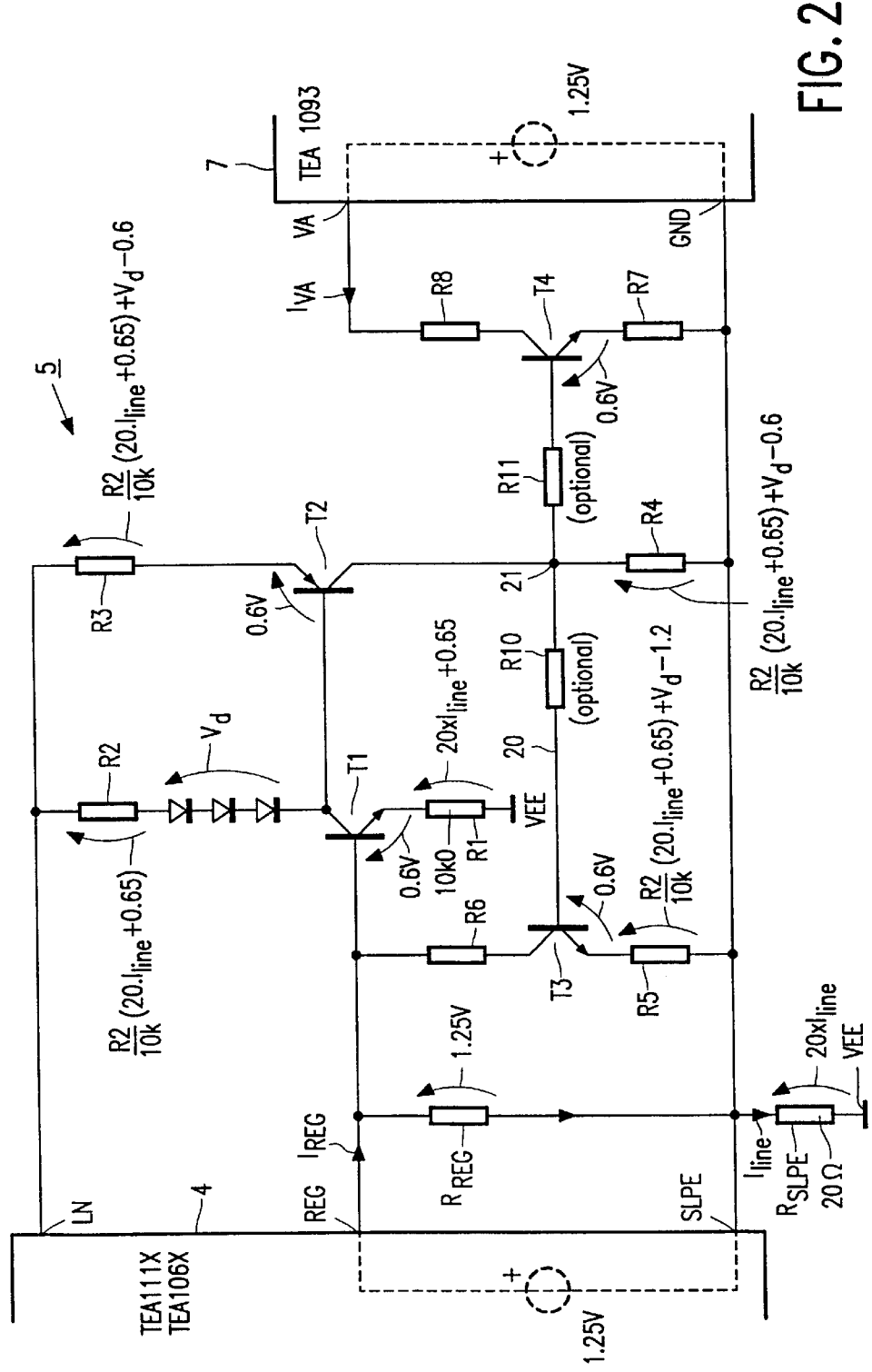
FIG. 2 shows a circuit diagram of a power supply circuit according to the present invention.

FIG. 2 shows a circuit diagram of the power supply circuit 5 according to the present invention. The power supply circuit components are distributed over the ICs 4 and 7, and over external components. A controllable current source embodied as a bipolar transistor T3 is coupled to the adjustment terminal REG. A base of the transistor T3 forms a control input 20 of the controllable current source T3, the control input 20 being coupled to the sensing means. By controlling the control input 20 in accordance with a predetermined function of the line current $I_{line}$, the adjustment means operates as current sinking or current sourcing means. Shown is a sinking or sourcing current $I_{REG}$. Internal circuitry in the IC TEA1112 is as described. Basically two diode drops form an internal voltage source of approximately 1.25 Volts. As a result of this, the voltage at the reference terminal REG is used as a sensing means in said power supply circuit. For current sinking, the resistor $R_{REG}$ is put between the terminals REG and SLPE, as shown, and for current sourcing the resistor $R_{REG}$ is put between the terminals REG and LN. When applying current sinking, the supply voltage on terminal SUP increases with an increasing sinking current. When applying current sourcing, the supply voltage on terminal SUP decreases with an increasing sourcing current. Herewith, demands of different countries can be fulfilled. A control resistor R4 is coupled between the base and the emitter of the transistor T3. A bias resistor R5 is coupled in the emitter path of the transistor T3. Herewith, starting of conduction of the transistor T3 is controlled. A current limiting resistor R6 is coupled between the collector of the transistor T3 and the adjustment terminal REG. Herewith, maximum voltage protection is achieved, i.e., the supply voltage on terminal SUP is limited to a given upper limit. Optionally, a resistor R10 is coupled between the control input 20 and a resistor R4 having its other end coupled to the sensing terminal SLPE. The power supply circuit 5 further comprises a control element in the form of a bipolar transistor T1 having a resistor R1 in its emitter base path. Herewith, a linear control function is achieved. The resistor R1 can be replaced by a diode (not shown) or by another non-linear control element. Herewith, the control function can be made logarithmic or any other transfer characteristic can be chosen. The collector of the transistor T1 is coupled to a junction 21 via a transistor T2 of which the base is coupled to the collector of the transistor T1, the collector is coupled to the junction 21, and the emitter is coupled to the terminal LN via a resistor R3. The collector of the transistor T1 is further coupled to the terminal LN via a series arrangement of at least one diode and a resistor R2. Shown are three diodes and a voltage $V_d$ across the diodes. The diodes are applied for temperature compensation. Typically, the resistor R1 has a value of 10 kiloOhms and the resistor $R_{SLPE}$ has a value of 20 Ohms. Herewith, the following voltage relationships hold. The voltage across the resistor $R_{SLPE}$ is $20.I_{line}$ Volts. The voltage across the resistor R1 is $20.I_{line}+0.65$. The voltage across the resistor R2 is $(R2/10\ k).(20.I_{line}+0.65)$ Volts. The voltage across the resistor R3 is $(R2/10\ k).(20.I_{line}+0.65)+V_d-0.65$ Volts. If the resistors R3 and R4 are equal, the voltage across the resistor R4 is $(R2/10\ k).(20.I_{line}+0.65)+V_d-0.6$ Volts. The voltage across the resistor R5 is $(R2/10\ k).(20.I_{line}+0.65)+V_d-1.2$ Volts. The voltage at the adjustment terminal REG is $U_{REG}=1.25+I_{line}.20$ Volts. These relationships can easily be verified from the circuit given. Herewith, the voltage across the resistor R4 being the control voltage of the controllable current source T3 is a linear function of the sensed line current $I_{line}$. With the power supply circuit given, the transistor T3 is not conducting when the line current $I_{line}$ is below a given threshold value. At higher line currents the output current of the transistor T3 increases linearly with the sensed line current $I_{line}$, and at still higher line currents the transistor T3 is controlled into saturation. In order to control the IC 7 in a similar way, the junction 21 is coupled to a further controllable current source in the form of a bipolar transistor T4 of which the collector is coupled to a current sinking or sourcing terminal VA of the IC 7 via a resistor R8. Shown is a sinking or sourcing current $I_{VA}$. The emitter of the transistor T4 is coupled to the ground terminal GND via a resistor R7.

Figure 3:
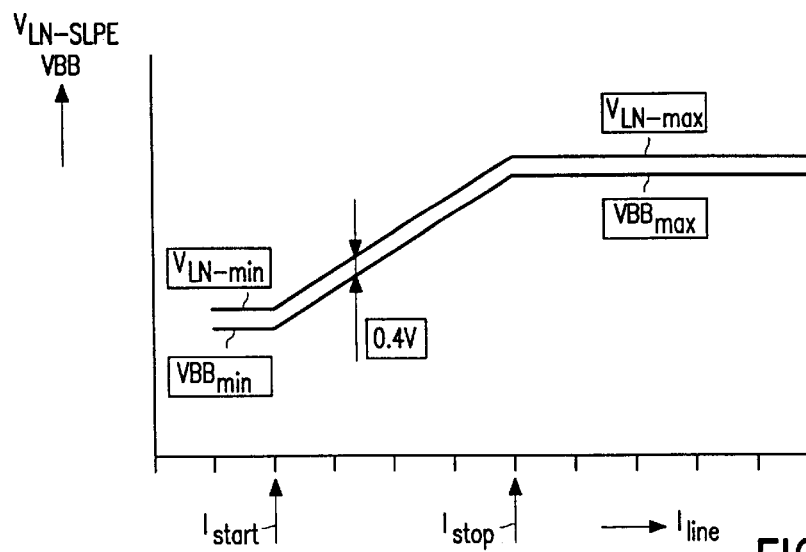
FIG. 3 shows a voltage curve to be met, as a function of a line current, according to the present invention.

FIG. 3 shows a voltage curve to be met, as a function of the line current $I_{line}$, according to the present invention. With the power supply circuit as described, the voltage $V_{LN-SLPE}=V_{LN-min}$ for low line currents where the transistor T3 is still non-conductive. At a start current $I_{start}$ the transistor T3 becomes conductive and the voltage $V_{LN-SLPE}$ linearly increases with the line current $I_{line}$. At a stop current $I_{stop}$, when the transistor T3 has become into saturation, the voltage $V_{LN-SLPE}$ is limited to the value $V_{LN-max}$. A similar curve holds for the stabilized voltage VBB. Shown are a minimum voltage $VBB_{min}$ and a maximum voltage $VBB_{max}$. The DC-mask (not shown) as prescribed for a given country can thus be tracked as desired.

Figure 4:
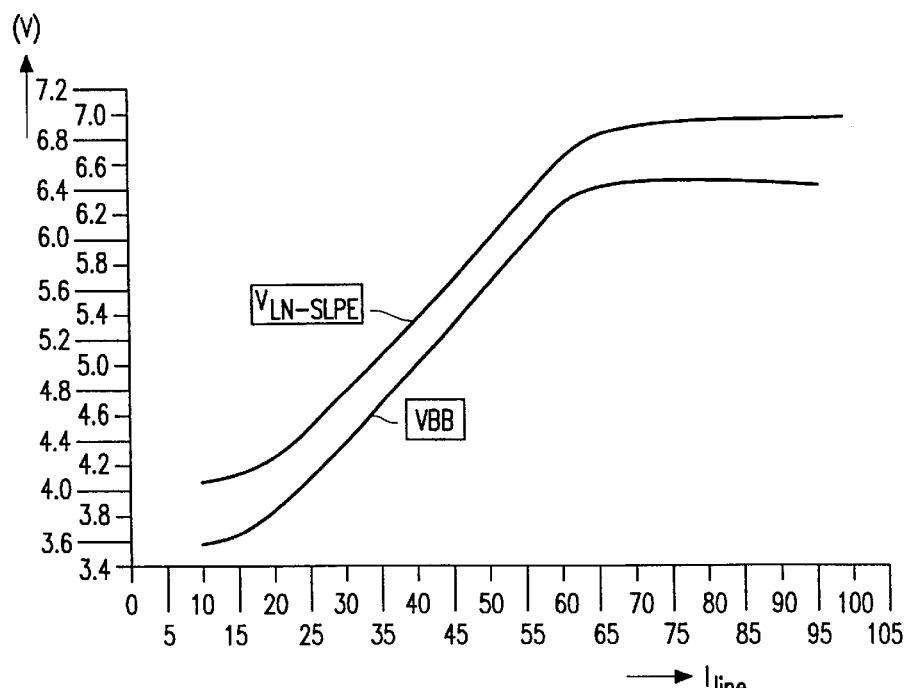
FIG. 4 shows measurement results of the power supply circuit according to the present invention.

FIG. 4 shows measurements results for $V_{LN-SLPE}$ and VBB of the power supply circuit 5 according to the present invention. As can be seen, the measured curves are close to the theoretical curves as given in FIG. 3.

In view of the foregoing it will be evident to a person skilled in the art that various modifications may be made within the spirit and the scope of the present invention as hereinafter defined by the appended claims and the present invention is thus not limited to the examples provided.

What is claimed is:

1. A wire bound telecommunications device to be coupled to a pair of telecommunication lines, said wire bound telecommunications device comprising:

a transmission circuit including a first adjustment terminal and a source sensing terminal, said transmission circuit operable to provide a first adjustment voltage at said first adjustment terminal and a sensing voltage at said sensing terminal in response to a telecommunication voltage being established between the pair of transmission lines when said wire bound telecommunications device is coupled to the pair of telecommunication lines; and a power supply circuit operable to form a supply voltage in response to the telecommunication voltage being established between the pair of transmission lines when said wire bound telecommunications device is coupled to the pair of telecommunication lines, said power supply circuit including, sensing means coupled to said sensing terminal of said transmission circuit, said sensing means for sensing a telecommunication line current flowing into said telecommunications device when said wire bound telecommunications device is coupled to the pair of telecommunication lines, and a first controllable current source coupled between said first adjustment terminal and said sensing terminal of said transmission circuit, said first controllable current source operable to control a magnitude of the supply voltage as a function of a magnitude of the telecommunication line current in response to the first adjustment voltage and the sensing voltage; and control voltage means coupled to a control input of the first controllable current source, said control voltage means for controlling an operational state of said first controllable current source in accordance with a logarithmic function.

2. The wire bound telecommunications device of claim 1, wherein said first controllable current source is in a conductive state when the telecommunication line current is between a first threshold value and a second threshold value.

3. The wire bound telecommunications device of claim 1, wherein the power supply circuit further includes current limiting means coupled between said first controllable current source and said first adjustment terminal, said current limiting means for establishing an upper limit of the supply voltage.

4. The wire bound telecommunications device of claim 1, wherein the power supply circuit further includes:

a voltage stabilizing circuit including a second adjustment terminal and a reference terminal, said voltage stabilizing circuit operable to provide a load voltage in response to the supply voltage; and a second controllable current source coupled between said second adjustment terminal and said reference terminal, said second controllable current source operable to control said voltage stabilizing circuit.

5. The wire bound telecommunications device of claim 4, whrein the power supply circuit further includes control voltage means coupled to a first control input of said first controllable current source and a second control input of said second controllable current source, said control voltage means for controlling a first operational state of said first controllable current source and a second operational state of said second controllable current source in accordance with a linear function.

6. The wire bound telecommunications device of claim 4, wherein the power supply circuit further includes control voltage means coupled to a first control input of said first controllable current source and a second control input of said second controllable current source, said control voltage means for controlling a first operational state of said first controllable current source and a second operational state of said second controllable current source in accordance with a logarithmic function.

7. A wire bound telecommunications device to be coupled to a pair of telecommunication lines, said wire bound telecommunications device comprising:

a transmission circuit to provide a first adjustment current in response to a telecommunication voltage being established between the pair of transmission lines when said wire bound telecommunications device is coupled to the pair of telecommunication lines; and a power supply circuit operable to form a supply voltage in response to the telecommunication voltage being established between the pair of transmission lines when said wire bound telecommunications device is coupled to the pair of telecommunication lines, said power supply circuit including, sensing means coupled to said sensing terminal of said transmission circuit, said sensing means for sensing a telecommunication line current flowing into said telecommunications device when said wire bound telecommunications device is coupled to the pair of telecommunication lines, and a first controllable current source coupled to said transmission circuit, said first controllable current source operable to control a magnitude of the supply voltage as a function of a magnitude of the telecommunication line current when said transmission circuit is providing the first adjustment current and the telecommunication line current is flowing into said wire bound telecommunications device; and control voltage means coupled to a control input of the first controllable current source, said control voltage means for controlling an operational state of said first controllable current source in accordance with a logarithmic function.

8. The wire bound telecommunications device of claim 7, wherein said first controllable current source is in a conductive state when the telecommunication line current is between a first threshold value and a second threshold value.

9. The wire bound telecommunications device of claim 7, wherein the power supply circuit further includes current limiting means coupled between said first controllable current source and said first voltage source, said current limiting means for establishing an upper limit of the supply voltage.

10. The wire bound telecommunications device of claim 7, wherein the power supply circuit further includes:

a voltage stabilizing circuit operable to provide a load voltage in response to the supply voltage, said voltage stabilizing circuit further operable to provide a second adjustment current in response to the telecommunication voltage; and a second controllable current source coupled to said second voltage source, said second controllable current source operable to control said voltage stabilizing circuit when said voltage stabilizing circuit is providing the second adjustment current and the telecommunication line current is flowing into said wire bound telecommunications device.

11. The wire bound telecommunications device of claim 10 wherein the power supply circuit further includes control voltage means coupled to a first control input of said first controllable current source and a second control input of said second controllable current source, said control voltage means for controlling a first operational state of said first controllable current source and a second operational state of said second controllable current source in accordance with a linear function.

12. A wire bound telecommunications device to be coupled to a pair of telecommunication lines, said wire bound telecommunications device comprising:

a transmission circuit to provide a first adjustment current in response to a telecommunication voltage being established between the pair of transmission lines when said wire bound telecommunications device is coupled to the pair of telecommunication lines; and a power supply circuit operable to form a supply voltage in response to the telecommunication voltage being established between the pair of transmission lines when said wire bound telecommunications device is coupled to the pair of telecommunication lines, said power supply circuit including, sensing means coupled to said sensing terminal of said transmission circuit, said sensing means for sensing a telecommunication line current flowing into said telecommunications device when said wire bound telecommunications device is coupled to the pair of telecommunication lines;

a first controllable current source coupled to said transmission circuit, said first controllable current source operable to control a magnitude of the supply voltage as a function of a magnitude of the telecommunication line current when said transmission circuit is providing the first adjustment current and the telecommunication line current is flowing into said wire bound telecommunications device; and control voltage means coupled to a first control input of said first controllable current source and a second control input of said second controllable current source, said control voltage means for controlling a first operational state of said first controllable current source and a second operational state of said second controllable current source in accordance with a logarithmic function.

* * * * *